US00RE34208E

United States Patent [19]

Shaw

[11] E

Patent Number: Re. 34,208

[45] Reissued Date of Patent: Mar. 30, 1993

[54] SWINGING BOB TOY

[76] Inventor: Laurence J. Shaw, 595 Fairway Dr., Novato, Calif. 94947

[21] Appl. No.: 516,785

[22] Filed: Apr. 30, 1990

Related U.S. Patent Documents

Reissue of:

[64] Patent No.: 4,878,868
Issued: Nov. 7, 1989
Appl. No.: 339,340
Filed: Apr. 17, 1989

[51] Int. Cl.[5] ..... A63H 33/00

[52] U.S. Cl. ..... 446/75; 446/247; 446/490; 273/414; 426/104

[58] Field of Search ..... 446/247, 215, 248, 252, 446/75, 71, 489, 490; 273/330, 58 C, 413, 414; 426/104

[56] References Cited

U.S. PATENT DOCUMENTS

| | | | |
|---|---|---|---|
| 93,249 | 8/1869 | Trebe | 273/58 C |
| 113,654 | 4/1871 | Harbison | 446/247 |
| 168,443 | 10/1875 | Arend | 446/490 |
| 672,099 | 4/1901 | Jackson | 446/247 X |
| 801,145 | 10/1905 | Feltner | 446/247 X |
| 1,241,000 | 9/1917 | Mulvey | 446/247 |
| 1,932,943 | 10/1933 | Smith | 446/247 |
| 2,071,041 | 2/1937 | Maggio | 446/247 |
| 2,161,154 | 6/1939 | Gertler | 446/253 |
| 2,429,027 | 10/1947 | Myers | 446/490 X |
| 3,605,327 | 9/1971 | Jones | 446/247 |

FOREIGN PATENT DOCUMENTS

| | | | |
|---|---|---|---|
| 572723 | 2/1934 | Fed. Rep. of Germany | 446/247 |
| 940844 | 12/1948 | France | 446/247 |

OTHER PUBLICATIONS

"OY-OY" (Photocopy of packaging), Playco Plastics, Inc., Lincoln, Mass. 01773, 1971.

*Primary Examiner*—Mickey Yu

[57] ABSTRACT

A swinging bob toy having bobs which are fastened to, or free to slide along a string. The design of the toy provides that: the string will have a lessened tendency to become tangled during operation, the toy will have a smoothness of motion, and be capable of new tricks and maneuvers, the toy will not become tangled during transportation thereof and will be safer to use. The bobs can be made of an edible material or chewing gum. A tubular storage case can be used to store the bob toy.

30 Claims, 4 Drawing Sheets

FIG 8
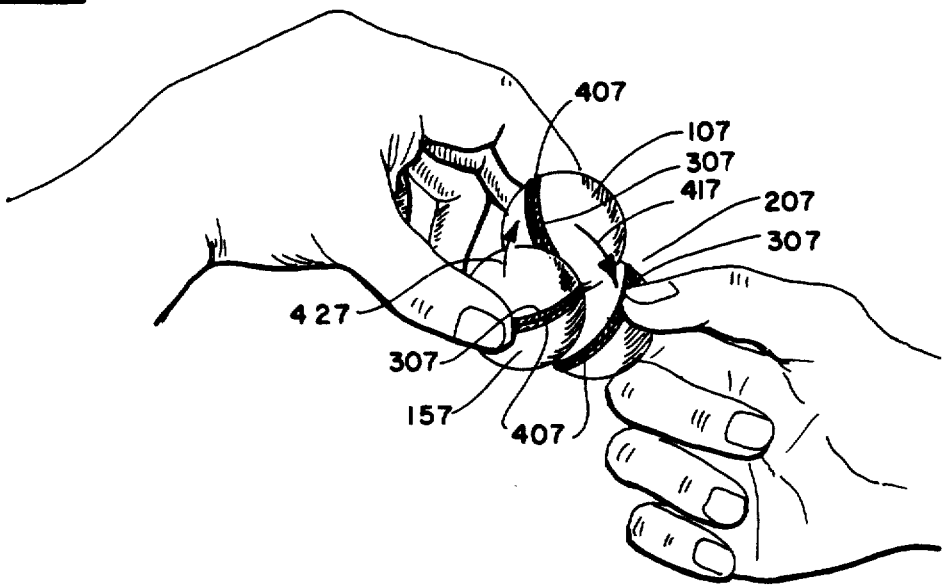
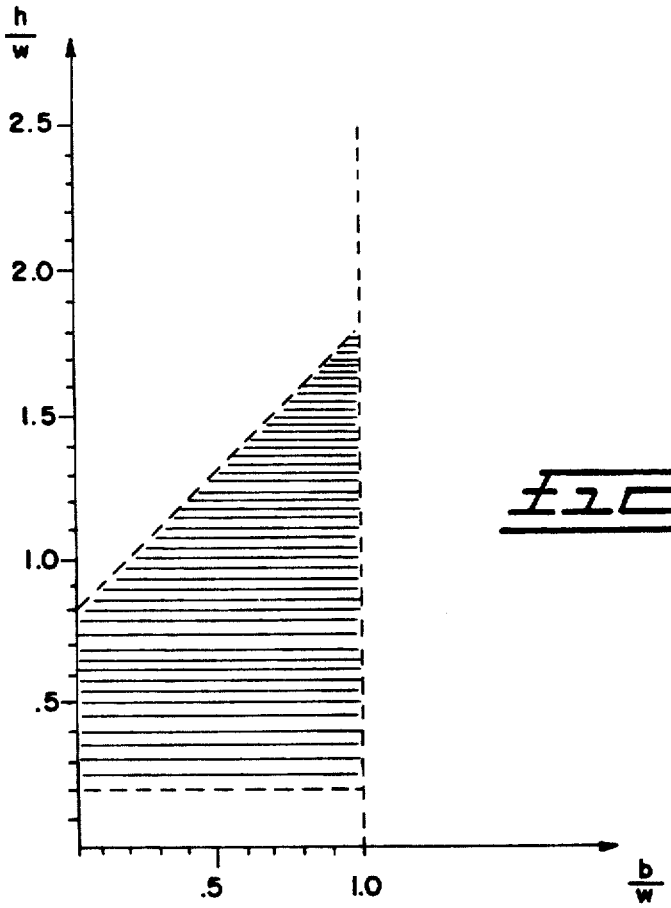
FIG 9

SWINGING BOB TOY

Matter enclosed in heavy brackets [ ] appears in the original patent but forms no part of this reissue specification; matter printed in italics indicates the additions made by reissue.

BACKGROUND - FIELD OF INVENTION

This invention relates to a swinging bob toy comprised of bobs which are fastened to, or free to slide along a string.

BACKGROUND - DISCUSSION OF PRIOR ART

The yo-yo and the skateboard are two of the most well-known and popular toys ever invented. These two products have had such great success because the basic mode of operation is easily accessible and appealing. In addition, a wide variety of maneuvers may be performed. These toys are of elegant design, highly transportable and may be operated in a wide variety of environments. The swinging bob toy described herein also has these features.

A primitive version of the swinging bob toy was invented by Frederic Robert Pilloud, and patented in Germany in 1933 under Patent No. 592,723. One of the major drawbacks of the swinging bob toy was its tendency to become tangled.

The swinging bob toy is comprised of a length of string and balls which are fastened to the string (henceforth to be referred to as secured bobs), balls which are free to slide along the string (henceforth to be referred to as free bobs), and a handle. The patent claims that interesting motions of the bobs may be produced by movement of the handle.

Although the German patent maintains that the bobs "may be made of any material" and may "have any desired shape or size", the operation of the toy is in fact strongly dependent on critical dimensions and weightings of the free bobs. When the free bobs are improperly designed, the motion will be unpleasantly jerky, or worse, the string will become tangled during operation.

One embodiment of the toy described in the aforementioned German patent has the free bobs attached to the string by means of a hook and eye arrangement. Bobs may attain high velocities and may accidentally strike the operator or nearby objects. Therefore, hard protrusions, such as a hook and eye, are hazardous.

When transporting the toy in a purse or pocket the string is likely to come tangled. The design of the toy, as outlined in the German patent, does not incorporate any features that would minimize this likelihood.

This toy is relatively unknown today probably because these design defects, which greatly interfere with its pleasurable operation, have never been resolved until this invention.

SUMMARY OF THE INVENTION

The invention seeks to prevent tangling of the string of the swinging bob toy and to maximize the smoothness of motion of the bobs during operation. The invention has also been redesigned to allow new tricks and maneuvers to be performed, to prevent tangling of the string during transportation, and to make the operation of the toy safer.

It is an object of this invention to provide an improved swinging bob toy.

It is another object of the invention to provide a swinging bob toy which will have a diminished tendency to become tangled.

These and other objects of the invention will become more apparent and will be better understood with reference to the subsequent detailed description considered in conjunction with the accompanying drawings.

BRIEF DESCRIPTION OF DRAWINGS

FIG. 8 depicts a perspective, in situ view illustrating the twisting motion which secures the bobs against one another for transportation. Most of the string has been stored in one or more of the storage grooves in the bobs.

FIG. 9 shows a graph wherein the shaded region in b/w, h/w space represents the range of acceptable dimensions of the free bob, in which tangling of the string of the swinging bob toy will be prevented.

DETAILED DESCRIPTION OF THE INVENTION

Figure 1:
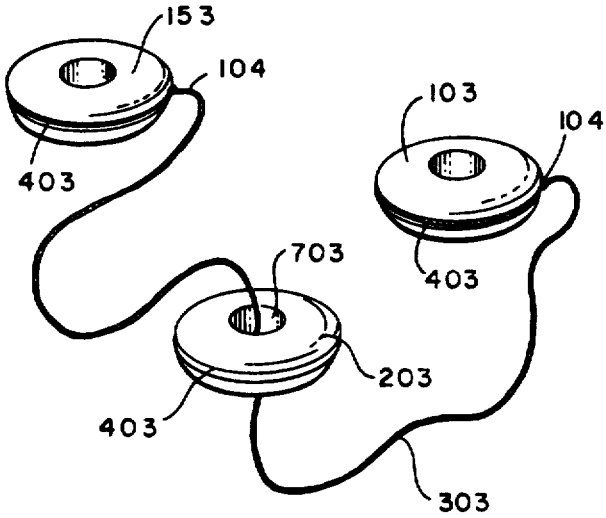
FIG. 1 is a perspective view of the toy showing the topological relation of the bobs and string for an embodiment with unweighted bobs.

Referring to FIG. 1, a topological arrangement of the bobs 103, 153 and 203, are shown with respect to string 303. The secured bobs 103 and 153 are attached at the ends of the string 303. The bobs 103, 153 and 203 can be made of birchwood. In this unweighted bob embodiment, the secured bobs 103 and 153 and the free bob 203 have the same design. This makes it more difficult to differentiate between the free bob 203 and the secured bobs 103 and 153, thus enhancing the visual appeal of the toy.

The string 303 is wrapped around the storage groove 403 of each of the bobs 103 and 153 and knots 104 are tied thereabout to secure bobs 103 and 153 to the string 303. The string 303 passes through the bore 703 of the free bob 203, allowing the free bob 203 to move freely along the string 303. The string 303 must be very flexible, and the kinetic friction between the string 303 and the free bob 203 must be small so as not to hamper the motion of the free bob 203. The string 303 can be Johnson and Johnson waxed dental floss having a length of approximately three feet.

Figure 2:
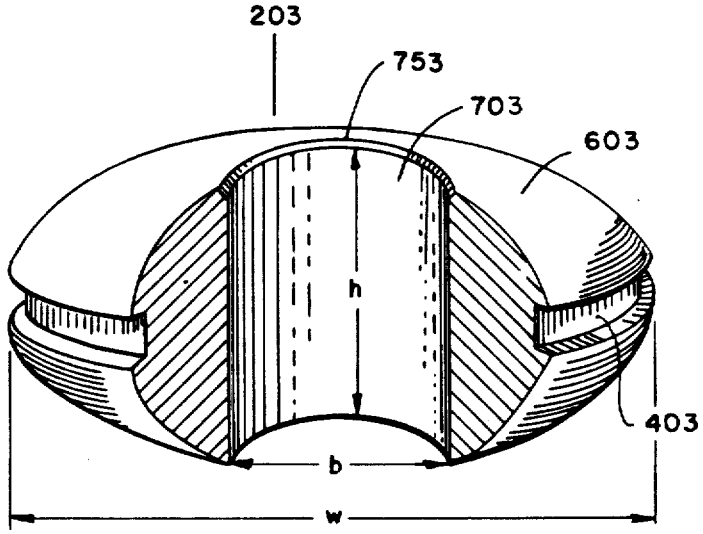
FIG. 2 is a cutaway, enlarged view of a free bob for the embodiment shown in FIG. 1.

Referring to FIG. 2, the free bob 203 of FIG. 1 is shown in greater detail. It is an ellipsoid of revolution with a cylindrical bore 703 along the axis of cylindrical symmetry, and an equatorial groove 403 concentric with the bore. The height of the free sliding bob 203 along the direction of the bore is approximately ¾", and the width of the free bob 203 perpendicular to the bore is approximately 1.5". The string storage groove 403 is of square channel cross section, and has a depth and width of approximately ⅛". The cylindrical bore 703 through the free bob 203 has a diameter of approximately ½". A small bevel is introduced along the periphery 753 where the inner surface of bore 703 meets the outer surface 603. The smooth exterior surfaces of the bobs 103, 153 and 203 minimize the chances of injury from accidental collisions of the bobs 103, 153 and 203 with the operator.

The dimensions of the free bob 203 is of crucial importance for optimum operation of the toy. The dimensions of the secured bobs 103 and 153 are only important in that they affect the weight of the bobs 103 and 153, and likelihood that bobs 103 and 153 collide with the string during operation. The smoothness of operation of the toy is invariant to changes in scale of length and density, but is dependent upon dimensionless parameter ratios b/w and h/w, where b is the width of the bore 703 near the ends thereof, h is the height of the bore 703 and w is the width of the free bob perpendicular to the axis of the bore 703.

Unfortunately, the motion of the bobs 103, 153 and 203 is too complicated to allow an ab initio mathematical analysis of the acceptable range of dimensions of the bobs 103, 153 and 203. High speed photography reveals unexpected features of the motion of the free bob 203. For well designed embodiments, the motion of free bob 203 is highly periodic, whereas for poorly designed embodiments the motion is much less regular. For well designed embodiments, the bore axis of the free bob 203 roughly follows the path of the swinging secured bob 153 as it describes the lower half of its orbit; but as the swinging secured bob 153 begins the upper half of its orbit, the rotation of the free bob 203 slows and stops. During the upper half of the orbit of the swinging secured bob 153, the free bob 203 either reverses its direction of rotation, or rotates in a horizontal plane, or performs some combination thereof. By the time the swinging secured bob 153 begins the lower half of its next orbit, the free bob 203 has completed a 180° rotation, and again the cylindrical symmetry axis points towards the swinging secured bob 153. On the other hand, the jerky motion of poorly designed embodiments appear to be attributed to the fact that the cylindrical symmetry axis of the free bob 203 sometimes follows the path of the swinging secured bob 153 through the upper half of its orbit.

These observations motivate rough physical arguments supporting the bounds to be presented below. For small values of h/w, the bore axis of the free bob is prevented from following the path of the swinging secured bob 153 through the top half of its orbit because as the axis of the free bob bore becomes horizontal, the outer edge of the free bob 203 comes in contact with the segment of string between the held secured bob 103 and the free bob 203. But if h/w is too small, the moment of ineria I about axes through the center of mass and perpendicular to the bore becomes too large. As will be discussed, large I is detrimental to the smoothness of motion of the toy. Therefore an intermediate range of values of h/w is desirable.

The effects of the value of b/w on the motion are less well understood. It appears that the bounds on the value of h/w becomes less stringent as b/w increases. This may be because less angular momentum is imparted to the free bob 203 during the bottom half cycle of the swinging secured bob 153 when b/h is large, and therefore it is easier to change the direction of rotation of the free bob 203.

Empirically, it has been found that embodiments falling within the approximate bounds $$0.2 < h/w,$$

and $$(h/w) - (b/w) < 0.8$$

(see FIG. 9) perform well. Conversely, those embodiments which fall outside these bounds perform poorly.

Figure 3:
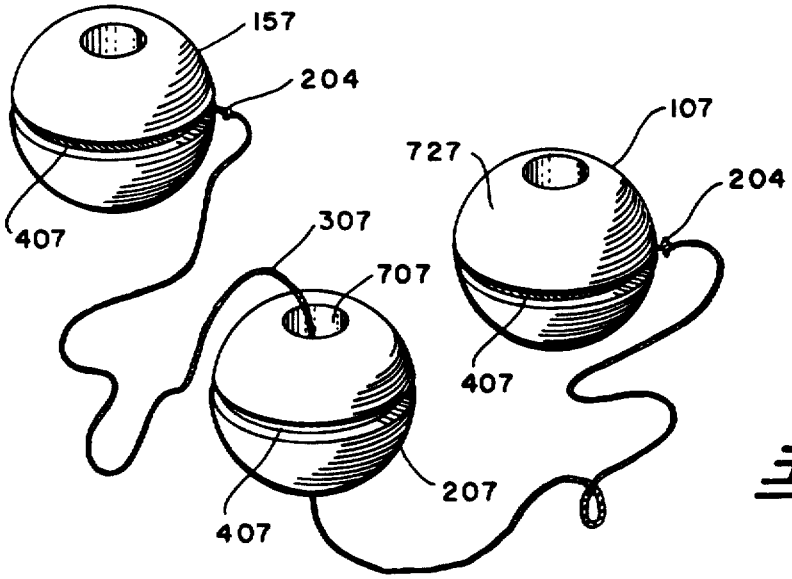
FIG. 3 is a perspective view of the toy showing the topological relation of the bobs and string of the embodiment which has weighted bobs.

Referring to FIG. 3 the topological arrangement of bobs 107, 157 and 207, about the string 307, is depicted for a weighted bob toy. The secure bobs 107 and 157 are attached at the distal ends of the string 307. In this embodiment, the secured bobs 107 and 157 and the free bob 207 have the same design. This makes it more difficult to differentiate between the free bob 207 and the swinging secured bob 107 and 157 during operation, and thereby enhances the visual appeal of the toy.

The string 307 is wrapped around the storage grooves 407 of secured bobs 107 and 157 and tied as before with knots 204 close to the secured bobs 107 and 157. The string 307 passes through the bore 707 of the free bob 207 and the bore 907 of the weight 807 (FIG. 4) allowing the free bob 207 to move freely along the string 307. The string 307 must be very flexible, and the kinetic friction between the string 307 and the free bob 207 must be small so as not to hamper the motion of the free bob 207. The string 307 can be Johnson and Johnson waxed dental floss having a length of approximately three feet.

Figure 4:
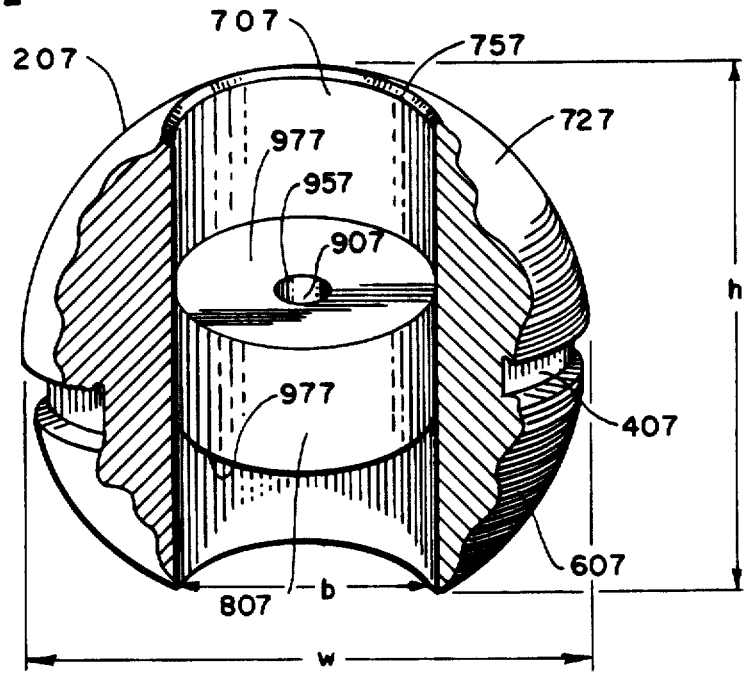
FIG. 4 is a cutaway view of a free bob according to the embodiment depicted in FIG. 3.

As the cutaway view of FIG. 4 shows, the free bob 207 consists of a soft protective outer casing 607 having an inner weight 807. The soft protective outer casing 607 prevents injury or damage from accidental collisions of the bob 207 with the operator or with nearby people or objects. The soft protective outer casing 607 can be made of nonrigid urethane foam with a slick outer coating. The stiffness of the foam and the slickness of the outer coating are comparable to that of the Nerf football manufactured by Parker Brothers. The outer casing 607 can be shaped like a sphere with a cylindrical bore 707 through the center and an equitorial groove 407 concentric with the bore. A bevel is introduced along the periphery 757 where the bore 707 meets the outer spherical surface 727. The bevel and the slick surface coating of the foam reduce the coefficient of kinetic friction between the string 307 and the outer casing 607. The radius of curvature of the spherical surface 727 is approximately 0.5". The string storage groove 407 can be of squared channel cross section having a depth and width of approximately ⅛". The cylindrical bore 707 has a diameter of approximately ½".

The weight 807 shown in FIG. 4 is secured by pressfit in the center of the bore 707. The axis of symmetry of the weight 807 is collinear with the axis of symmetry of the outer casing 607. The weight 807 can be cylindrical with a cylindrical bore 907 disposed along the axis of symmetry. A slight bevel can be placed at periphery 957 where the bore 907 meets the top and bottom planes 977. The weight 807 can be made of brass. The height of the weight 807 can be approximately 0.4", the diameter about ½" and the bore 907 diameter about ⅛". The string 307 passes through the bore 907 of the weight and the bore 707 of the outer casing 607.

The dimensions and weighting of the free bob 207 are of crucial importance for optimum operability of the toy. As with the aforementioned unweighted-bob embodiment described above, the weighted-bob embodiment must fall within the approximate bounds $$0.2 < h/w,$$

and $$(h/w) - (b/w) < 0.8,$$

as illustrated in FIG. 9, in order that the toy perform at its best. Conversely those embodiments which fall outside these bounds do not perform as well. The new degrees of freedom of construction for the bobs 107, 157 and 207 introduced by density inhomogeneities motivate the introduction of the dimensionless ratio $mh^2/I$, where m is the mass of the secured bobs 107 and 157, and I is the moment of inertia of the free bob 207 about axes through the center of mass and perpendicular to the bore. Notice that $mh^2/I$ is invariant to changes of scale of length and density. The new freedom introduced by density inhomogeneities relaxes the constraints on the values of h/w and (h/w)−(b/w) mentioned above, since the action of the free bob 207 as a pivot is always improved by decreasing I, for a given weight and set of dimensions of the free bob 207. Designs which fall outside bounds (1) and (2), may be made to provide acceptable operation by sufficiently increasing the value of $mh^2/I$, and the smoothness of motion of designs which do satisfy (1) and (2) can be further improved by increasing $mh^2/I$. Although it is not intended for the invention to be limited by any one parameter of design, for reasons to be presented hereinafter the ratio $mh^2/I$ is believed to be a relevant parameter.

The free bob 207 must readily rotate in response to the torque produced by the tension of the string 307. For a given mass and set of dimensions of the free bob 207, ease of rotation of the free bob 207 is facilitated by minimizing the moment of inertia I of the free bob 207 about axes perpendicular to the bore 707. (Note that the minimization of I affords the opportunity to shield the dense portion of the free bob 207 with the soft protective casing 607.)

Also the dimensions of the free bob 207 must be such as to efficiently couple the tension of the string 307 to the torque applied to the free bob 207. If the torque $\Gamma$ is related to the string tension f by $r_\Gamma = \Gamma/f$, then $r_\Gamma$, the characteristic length of the coupling between the string tension and the torque, must not be too small. The characteristic length $r_\Gamma$ is generally the same order of magnitude as the height h of the bore 707.

Figure 6:
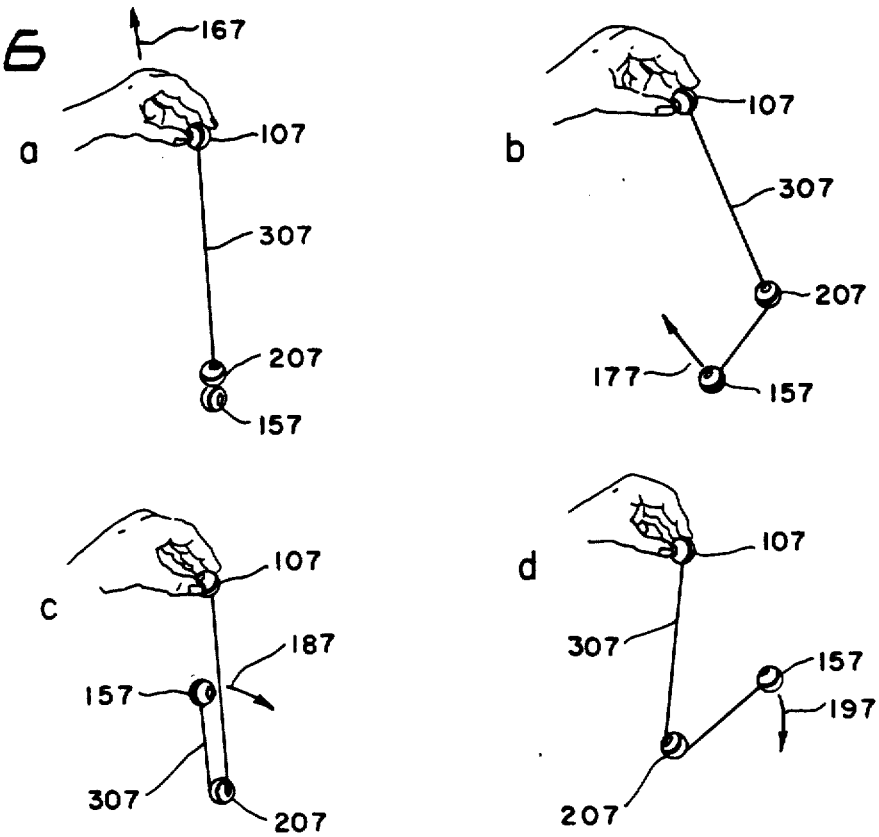
FIGS. 6a–d are schematic, in situ views illustrating time sequences of the operation of the toy. After an initial sharp upward motion of the hand shown in the FIG. 6a, the bobs swing about each other while nearly confined to a vertical plane as depicted in FIGS. 6b–d.

Since the direction of the axis of the bore 707 of the free bob 207 should readily follow the motion of the swinging secured bob 157 (see FIG. 6), the characteristic time of rotation of the free bob 207 should be small compared to the characteristic time for the revolution of the swinging secure bob 157. Therefore, the relevant quantity is the ratio of the time $t_e = \sqrt{ml/f}$ it takes for the secured bob 157 of mass m to perform a complete revolution at constant velocity on a string of length 1 under a string tension f, to the time $t_m = \sqrt{4\pi I/fr_\Gamma}$ required for the free bob 207 to perform a complete rotation starting from rest under the action of a torque equal to $fr_\Gamma$. It is desired that the motion be smooth even for 1 approximately equal to the height h of the bore. The substitution of h for 1 and $r_\Gamma$ gives the design criterion that $\sqrt{mh^2/I}$ is to be maximized. If $\sqrt{mh^2/I}$ is somewhat less than unity, the motion will be jerky. Furthermore, if $\sqrt{mh^2/I}$ is extremely small, the string will tangle.

A method of storing and transporting the swinging bob toy involves the use of a cylindrical plastic webbing 105, such as "Boinks" webbing produced by Endless Possibilities, Inc., of Sparta, N.J. Referring to FIGS. 5a–d, the diameter of the webbing 105 should be slightly smaller than that of the bobs 107, 157, and 207 (or 103, 153 and 203) so that the bobs 107, 157, and 207 are held in place when inserted into the webbing 105. The length of the webbing 105 is approximately four times the width of the bobs 107, 157, and 207.

OPERATION OF INVENTION

An element of the appeal of the toy is the many modes of operation which this simple device may perform. The performance of two basic modes of operation, will be hereinafter described. One such maneuver is only possible when the handle described in the aforementioned German patent is replaced with a bob. In addition, the use of the string storage groove 407 for tangle-free transportation of the toy will also be described. The operations described here in terms of the weighted-bob embodiment may also be performed with the unweighted-bob embodiment. Also note that all functions and maneuvers described for this embodiment may also be performed with an embodiment where the secured bobs 107 and 157 are not fixed to points along the string 307, but rather are free to slide along, yet are constrained to, the string 307, since the secured bobs 107 and 157 nevertheless tend to stay near the ends of the string 307.

One basic mode of operation involves holding bob 107 in one hand (see FIGS. 6a–6d) and producing a revolving motion of bobs 157 and 207 about each other, their motion being nearly confined to a vertical plane. The motion may be initiated from a stationary state where the free bob 207 has come to rest against the lower secured bob 157 near the bottom end of the string 307 as shown in FIG. 6a. A sharp upward jerk (arrow 167) of the hand (as illustrated in FIG. 6a) will induce the separation of bobs 157 and 207. When this is followed by smooth oscillations of the hand in a vertical plane at approximately the frequency of revolution of bobs 157 and 207, bobs 157 and 207 will continue to revolve about each other (arrows 177, 187 and 197) as depicted in FIGS. 6b–d respectively. The distance of separation of bobs 157 and 207 may be controlled by the motion of the hand. The smoothly oscillating tension of the string and the rhythmic motion of the hand make the execution of even this basic maneuver pleasing and enjoyable. Only the two bobs 157 and 207 are necessary for the mode of operation since the string 307, instead of the secured bob 107, may be used as a handle.

A more complicated motion of bobs 157 and 207 may additionally be produced by a combination of both horizontal and vertical oscillations of the hand. The paths of bobs 157 and 207 will now describe a complicated superposition of the vertical revolutions described above with additional horizontal oscillations. The magnitude of the horizontal oscillations is controlled by the motion of the hand allowing the production of motions and patterns pleasing to the hand and eye.

By the substitution of a bob for the handle as previously suggested, a new symmetry is created about the free bob 207. This allows either bob 107 or 157 to be held during operation. One maneuver that can be performed with this new arrangement is the switching, during operation, of bob 157 in place of formerly held bob 107. This procedure is shown in FIGS. 6a–6c.

Figure 7:
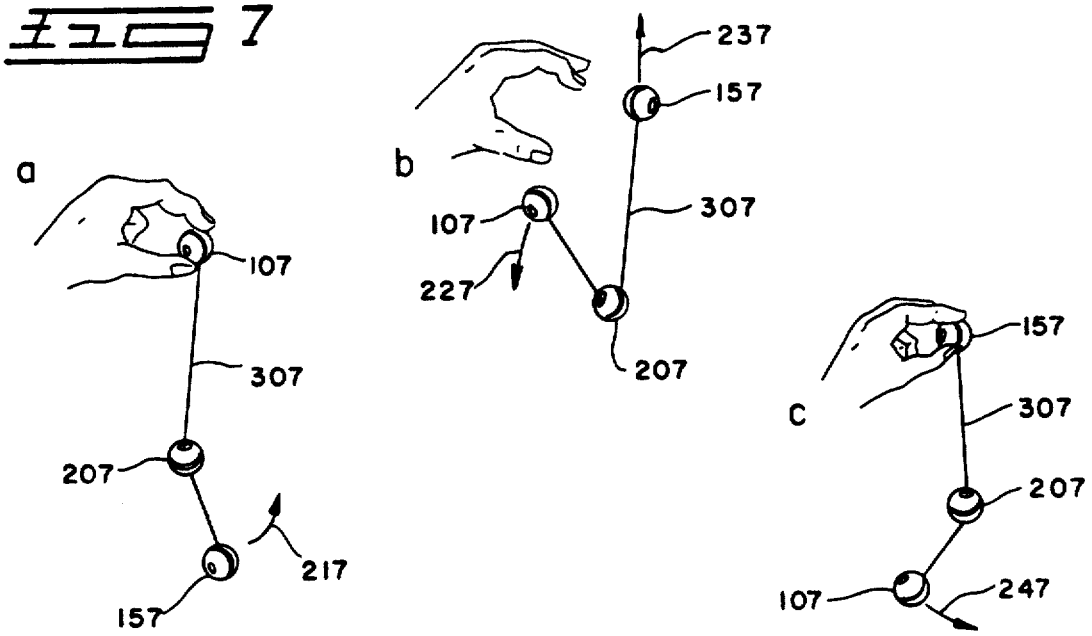
FIGS. 7a–c are schematic, in situ views showing time sequences of a maneuver that is possible with a swinging bob toy having two secured bobs each disposed on respective distal ends. The secured bob which had previously been held in FIG. 7a, is released in FIG. 7b, and the operator immediately grasps the other secured bob (FIG. 7c) which may henceforth be held as operation continues.

A snap of the wrist while bob 157 is near its lowest position (arrow 217, FIG. 7a) imparts enough kinetic energy to bob 157 for it to reach a height approximately equal to that of the hand (arrow 237, FIG. 7b). The operator may then release bob 107 (arrow 227, FIG. 7b) and grab bob 157, (FIG. 7c) which may thereafter be held during operation, as bob 107 becomes the revolving bob (arrow 247, FIG. 7c).

Referring to FIG. 8, string storage grooves 407 encircling one or more of the bobs provide a convenient storage region for the string 307, preventing the string 307 from becoming tangled during pocket or purse transportation. Before transportation, most of the string 307 may be wrapped around one or more of the bobs so as to lie in one or more of the storage grooves 407. By reserving a small length of string 307 the two bobs 107 and 157 may be revolved about each other (arrows 417 and 427, respectively) a number of times to take up the remaining length of the string. This causes the three bobs 107, 157, and 207 to press up against each other, the friction between bobs the 107, 157 and 207 securing their positions and preventing their relative motion during transportation. After transporting the toy, the steps for the storage of the string may be reversed. The string will not be tangled and the toy will be ready for use.

Figure 5:
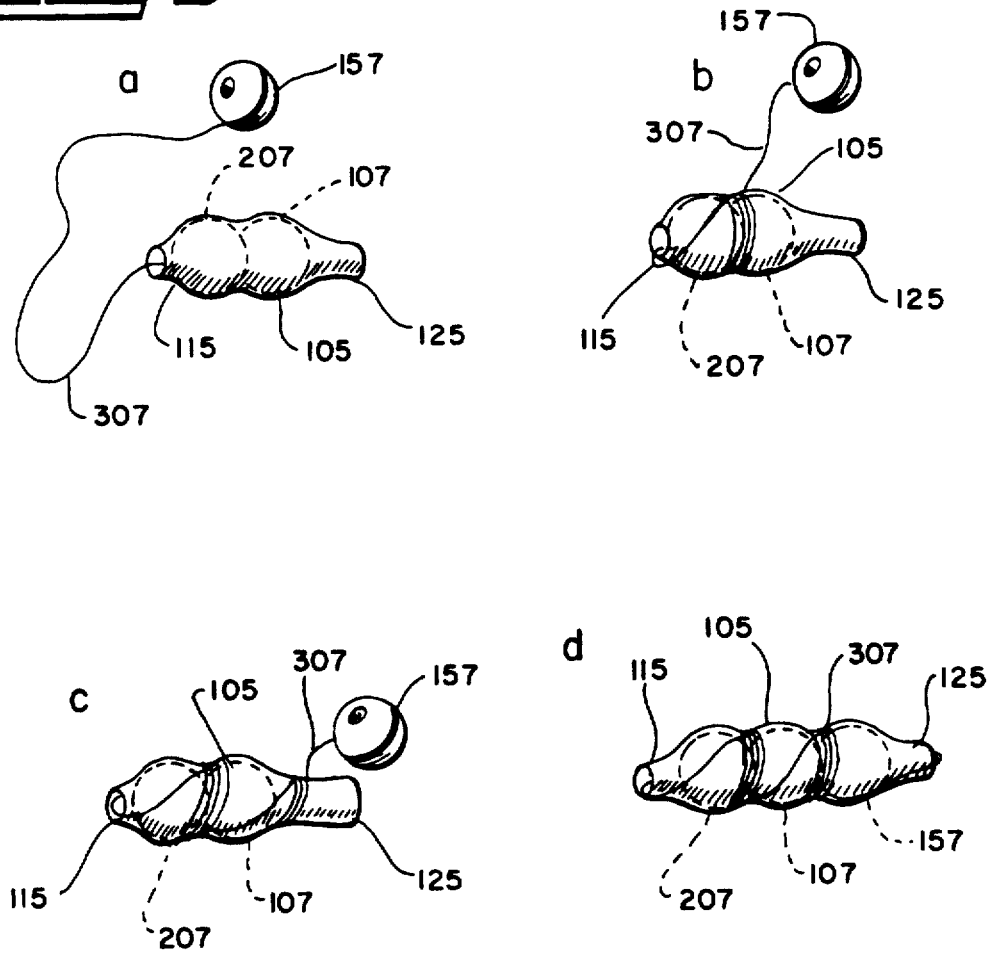
FIGS. 5a–d are a sequence of perspective views of the toy and storage webbing illustrating how the toy may be stored with the string wrapped around the outside of the webbing.

To store the toy in the storage webbing 105, a secured bob 107 (or 103) and the free bob 207 (or 203) are inserted into one end 115 of the webbing 105 (FIG. 5a). Approximately half the length of the string 307 is wrapped around the webbing between bobs 107 and 207 (FIG. 5b) and then most of the remaining length of the string 307 is wrapped around the webbing 105 between bob 107 and the other end 125 of the webbing 105 (FIG. 5c). Finally the other secured bob 157 (or 153) is inserted into end 125 of the webbing 105 (FIG. 5d). Normal pocket or purse transportation will not dislodge this storage arrangement.

By reversing the storage steps the toy may be disengaged from the webbing 105 and the string 307 will not be tangled. The toy may also be stored with the string inside the webbing. Since the bobs 107, 157 and 207 fit snugly in the webbing 105, the string 307 can not work its way between the bobs 107, 157 and 207 and the webbing 105 if not initially placed there. Upon removing the toy from the webbing 105 the string 307 will not be tangled.

Thus, it will be see that the improvements presented herein, consistent with the objects of the invention for the swinging bob toy prevent tangling of the string during operation, allow new tricks and maneuvers to be performed with the toy, provide a convenient method of preventing the string from becoming tangled during transportation of the toy, and make the toy safer.

While the above description contains many specificities, these should not be construed as limitations on the scope of the invention, but rather as exemplifications of preferred embodiments thereof. Many other variations are possible. For example, secured bobs 107 and 157 need not have the same dimensions, weight or weighting as each other or the free bob 207, the bobs 107, 157 and 207 may be decorated with a colorful designs to enhance visual appeal, the weighting of the free bob 207 may be free to move within the free bob 207, a mechanism may be provided for the production of noises during operation of the toy, the secured bobs 107 and 157 may be constrained to, yet free to slide along the string 307, the string 307 may have a different length or an adjustable length, the bobs 103, 153 and 203 (and possibly the string 303) may be made of edible materials or chewing gum, the string storage grooves 407 need not be equatorial, and the secured bobs 107 and 157 may be attached to the string 307 in a number of ways.

Accordingly, the scope of the invention should be determined not by the embodiments illustrated, but by the appended claims and their legal equivalents.

Having thus described the invention what is desired to be protected by Letters Patent is presented by the following appended claims.

What is claimed is:

1. A toy comprising:

(a) a flexible elongated tethering means, (b) a first mass [secured] *constrained* to said tethering means, [and]

(c) a second, movable mass, having a bore with a height h and a width b, the bore of said movable mass allowing said movable mass to move freely along said tethering means, and said second, movable mass having an outer width w, such that $$0.2 < h/w$$

and $$(h/w) - (b/w) < 0.8,$$

whereby the operation of said toy is smooth and the tangling of said tethering means is infrequent, *and*

*(d) a third mass constrained to said tethering means so as to constrain said second, movable mass between said first and third masses, said first, second and third masses having substantially equal weight, shape and size, thereby permitting the performance of trick mid-air maneuvers.*

2. The toy of claim 1, wherein [a third mass is secured to said tethering means so as to constrain said second, movable mass to positions along said tethering means between said first and third masses, whereby either of said first and third secured masses may be used as a grippable mass] *said bore is substantially central, said tethering means can pass in a substantially straight line through said bore, and said movable mass can move freely along substantially the entire length of said tethering means.*

3. The toy of claim 2, wherein one of said masses has a circumferential groove in which said tethering means may be stored, whereby tangling of said tethering means during transportation and storage of said toy may be prevented.

4. The toy of claim 2, further comprising a stretchable, substantially tubular storage case of diameter smaller than a width of said masses, whereby various arrangements involving the insertion of said masses into said storage case prevent said tethering means from becoming tangled during transportation of said toy.

5. The toy of claim 2, wherein said masses are made of edible material or chewing gum.

6. The toy of claim 2, wherein [said second movable mass and said first and third secured masses have substantially equal mass] *said tethering means is substantially unbifurcated along the range of motion of said second mass, said tethering means is comprised of at least one strand, and said strands of said tethering means pass through a single channel of said bore.*

7. The toy of claim 6 wherein [said second movable mass and said first and third secured masses have substantially equal dimensions] *the swinging motions of said toy are substantially influenced solely by said flexible tethering means and said first, second and third masses, and said first, second and third masses are substantially spherical.*

8. A toy comprising:

(a) a flexible elongated tethering means, (b) a first [secured mass secured] *mass constrained* to said tethering means, (c) a bored movable mass, the bore of said movable mass allowing said movable mass to move freely along said tethering means, said movable mass having a moment of inertia I about an axis through its center of mass and perpendicular to the bore, said movable mass having given dimensions and weight and an inhomogeneous density distribution and a reduced moment of inertia, I, with respect to that of a homogeneous density mass with substantially the same dimensions and weight, whereby the smoothness of operation of said toy is enhanced, and the tendency for tangling of said tethering means is diminished.

9. The toy of claim 8, wherein a [second secured] *third* mass is [secured] *constrained* to said tethering means so as to constrain said movable mass to positions along said tethering means between said first and [second secured] *third* masses, whereby either of said first or [second secured] *third* masses can be used as a handle.

10. The toy of claim 8, wherein at least one of said masses has a soft protective [coating] *casing* shielding a dense inner region, whereby the safety of operation is enhanced.

11. The toy of claim 9, wherein at least one of said masses has a soft protective [coating] *casing* shielding a dense inner region, whereby the safety of operation is enhanced.

12. The toy of claim 11, wherein at least one of said masses has a circumferential groove in which said tethering means may be wound and stored, whereby tangling of said tethering means during transportation and storage of said toy may be prevented.

13. The toy of claim 11, further comprising a stretchable, substantially tubular storage case of diameter smaller than a width of said masses, whereby various arrangements involving the insertion of said masses into said storage case prevent said tethering means from becoming tangled during transportation of said toy.

14. The toy of claim 11, wherein said movable mass and said first and [second secured] *third* masses have substantially equal mass.

15. The toy of claim 14, wherein said movable mass and said first and [second secured] *third* masses have substantially equal dimensions.

16. A toy comprising:

a tethering means;

a first *mass* and *a* second mass, each of which is [secured to distal ends of] *constrained to* said tethering means; and a movable mass movably disposed upon said tethering means between said first and second [secured] masses, said movable mass being inhomogeneous and characterized by a greater density in a center portion thereof, whereby the tendency of tangling is diminished for said tethering means.

17. A toy in accordance with claim 16, wherein said movable mass has an inner bore having a height h and a width b and an outer dimensional width w, such that approximately:

$$0.2 < h/w$$

and $$(h/w) - (b/w) < 0.8.$$

*18. A toy comprising:*

*(a) a flexible elongated tethering means,*

*(b) a first mass constrained to said tethering means,*

*(c) a bored movable mass, the bore of said movable mass allowing said movable mass to move freely along said tethering means, at least said movable mass having an inhomogeneous density distribution, the smoothness of operation of said toy being enhanced, and the tendency for tangling of said tethering means being diminished, and*

*(d) a second mass constrained to said tethering means so as to constrain said movable mass to positions along said tethering means between said first and second masses, either of said first or second masses being usable as a handle, at least one of said masses having a soft protective casing shielding a dense inner region, whereby safety of operation is enhanced.*

*19. The toy of claim 18, wherein at least one of said masses has a circumferential groove in which said tethering means may be wound and stored, whereby tangling of said tethering means during transportation and storage of said toy may be prevented.*

*20. The toy of claim 18, further comprising a stretchable, substantially tubular storage case of diameter prior to stretching smaller than a width of said masses, whereby various arrangements involving the insertion of said masses into said storage case prevent said tethering means from becoming tangled during transportation of said toy.*

*21. The toy of claim 18, wherein said movable mass and said first and second masses have substantially equal mass.*

*22. The toy of claim 18, wherein said movable mass and said first and second masses have substantially equal dimensions.*

*23. The toy of claim 18, wherein said movable mass has a greater density in a center portion thereof.*

*24. A kinetic toy comprising:*

*(a) a flexible elongated tethering means, said tethering means having at least one strand;*

*(b) a first mass constrained to said tethering means;*

*(c) a second mass constrained to said tethering means; and*

*(d) a third mass constrained to said tethering means between said first and second masses, said strands of said tethering means passing through a single channel*

*of a substantially central bore in said third mass, said strands being able to pass in a substantially straight line through said channel, said third mass being able to move freely along substantially the entire length of said tethering means, said tethering means being substantially unbifurcated along the range of motion of said third mass, swinging motions of said toy being substantially influenced solely by said flexible tethering means and said first, second and third masses, and said first, second and third masses having substantially the same weight, shape and size, thereby permitting the performance of trick midair maneuvers.*

*25. The toy of claim 24, further comprising a stretchable, substantially tubular storage case with a diameter that is, prior to stretching, smaller than a width of said masses, whereby various arrangements involving the insertion of said masses into said storage case prevent said tethering means from becoming tangled during transportation of said toy.*

*26. The toy of claim 24 wherein the exterior surface of said first, second and third masses are substantially spherical.*

*27. The toy of claim 24, wherein said third mass has an inhomogeneous density distribution with a relatively dense region in a central portion thereof, thereby reducing a moment of inertia of said third mass.*

*28. The toy of claim 24 wherein the exterior surfaces of said first, second and third masses are substantially convex.*

*29. The toy of claim 24 wherein the exterior surfaces of said first, second and third masses are substantially ellipsoids of revolution.*

*30. The toy of claim 24 wherein said tethering means is substantially the only tethering means constraining said first, second and third masses, and said bore in said third mass is substantially the only bore in said third mass that said tethering means passes through.*

* * * * *